(12) United States Patent
Packer et al.

(10) Patent No.: US 8,157,154 B2
(45) Date of Patent: Apr. 17, 2012

(54) THREE-BODY JOINING USING FRICTION STIR PROCESSING TECHNIQUES

(75) Inventors: Scott M. Packer, Alpine, UT (US); Russell J Steel, Salem, UT (US); Jonathan A. Babb, West Jordan, UT (US); Michael P. Miles, Springville, UT (US); Kent Kohkonen, Orem, UT (US)

(73) Assignees: Brigham Young University, Provo, UT (US); Megastir Technologies, LLC, Provo, UT (US)

(\*) Notice: Subject to any disclaimer, the term of this patent is extended or adjusted under 35 U.S.C. 154(b) by 0 days.

(21) Appl. No.: 12/962,402

(22) Filed: Dec. 7, 2010

(65) Prior Publication Data

US 2011/0073634 A1 Mar. 31, 2011

Related U.S. Application Data

(63) Continuation of application No. 11/818,528, filed on Jun. 13, 2007, now Pat. No. 7,845,545.

(51) Int. Cl.
*B23K 20/12* (2006.01)
(52) U.S. Cl. ...................... 228/2.1; 228/112.1
(58) Field of Classification Search ................... 228/2.1, 228/112.1
See application file for complete search history.

(56) References Cited

U.S. PATENT DOCUMENTS

| 5,697,544 | A | 12/1997 | Wykes |
| 6,457,629 | B1 | 10/2002 | White |
| 6,497,355 | B1 | 12/2002 | Ding et al. |
| 6,742,697 | B2 | 6/2004 | McTernan |
| 6,843,404 | B2 | 1/2005 | Litwinski |
| 6,988,651 | B2 | 1/2006 | Stevenson et al. |
| 2002/0125297 | A1 | 9/2002 | Stol et al. |
| 2003/0201306 | A1 | 10/2003 | McTernan et al. |

FOREIGN PATENT DOCUMENTS

| JP | 10-230372 | 9/1998 |
| JP | 2004 025296 | 1/2004 |
| JP | 2004-141948 | 5/2004 |
| SU | 1466896 | 3/1989 |

*Primary Examiner* — Jessica L Ward
*Assistant Examiner* — Kevin E Yoon
(74) *Attorney, Agent, or Firm* — Morriss O'Bryant Compagni, PC

(57) ABSTRACT

A friction stir tool is provided to perform friction stir riveting using a partially consumable pin, wherein the pin includes a cutting edge on a bottom surface thereof, wherein the tool is rotated at a first speed to enable cutting by the pin into a first material that is overlapping a second material, wherein after the pin has cut to a sufficient depth, the rotational speed of the tool is increased to thereby enable plasticization of the consumable pin, the first material, and the second material, wherein the tool is then rapidly decelerated until stopped, enabling diffusion bonding between the pin, the first material and the second material.

6 Claims, 4 Drawing Sheets

THREE-BODY JOINING USING FRICTION STIR PROCESSING TECHNIQUES

CROSS REFERENCE TO RELATED APPLICATIONS

This document claims priority to and incorporates by reference all of the subject matter included in the non-provisional patent application, having Ser. No. 11/818,528.

RELATED APPLICATIONS

This application claims priority to and incorporates by reference all of the subject matter of U.S. Patent Application Ser. No. 60/804,628, filed Jun. 13, 2006, and of U.S. Patent Application Ser. No. 60/816,396, filed Jun. 23, 2006.

BACKGROUND OF THE INVENTION

1. Field of the Invention

This invention relates generally to friction stir joining methods. More specifically, the present invention is a method of joining metal work pieces together using a consumable friction stir tool that has at least a partially consumable pin, wherein the pin has a cutting edge that cuts through a first work piece material when rotated at a first speed. After at least cutting through the first work piece material to a sufficient depth, the rotational speed of the tool is changed to cause plasticization of the pin itself, as well as the first and second work piece materials being joined. After sufficient heating of the first and second work piece materials and the pin, the rotation of the tool is rapidly decelerated or stopped completely to enable the bonding of the pin and the first and second work piece materials. This process will be referred to throughout this document as friction stir riveting.

2. Description of Related Art

There are many methods for joining metal work pieces together; some of which include welding, spot welding, fasteners (such as screws and bolts), friction stir welding, etc. The three fundamental principles that govern all joining methods include mechanical attachment, fusion joining (welding), and solid state joining (friction welding). Each principle technique has advantages; however the method often selected for an application is dictated by the one having the fewest tolerable disadvantages.

Examples of mechanical work piece joining methods include screws, nuts and bolts, dove tail, swaging, riveting, interference attachment, etc. Many applications cannot use screws or bolts because the threads have limiting load carrying capability, the high cost of multiple components and assembly, the cost of the hole that must be placed in the work pieces and/or the space required for the fasteners. Dove tail and other work piece locking methods lock in specified directions but can slide or rotate apart in other directions. Rivets have perhaps the greatest joining strength per unit area and volume of any mechanical fastener but the mechanical deformation of the rivet head reduces the energy absorbing capability as well as elongation.

When mechanical methods are not acceptable joining techniques, fusion welding methods are utilized unless the work pieces are not considered weldable. For example, aircraft components made from 7000 series aluminum are not considered weldable because the resulting weld strength is as low as 50% of base metal properties. High melting temperature materials (HMTM) such as steel, stainless steel and nickel base alloys can be welded but the joint strength is limited to problems associated with fusion welding. These problems include, but are not limited to, solidification defects, hard/soft zones within the weld macrostructure, residual stresses resulting from liquid to solid phase transformation, porosity, cracking, non-uniform and unpredictable microstructures, corrosion susceptibility, work piece deformation, and loss of work piece base material properties. Post weld operations are often needed to repair distortion or evaluate the weld nondestructively and add cost to the process. In addition, there are health issues related to hexavalent chromium and manganese exposure as well as potential retina damage to the operator if proper safety procedures are not followed. In many cases, work pieces must be increased in size to use a base material of lower strength that is considered weldable in favor of a higher strength material that is not considered weldable. This is the case with automobile car bodies that are currently manufactured from lower strength steels. Advanced high strength steels (Dual Phase and TRIP steels) could be used in the frame construction to dramatically lower vehicle weight but these materials have not been used because of fusion weldability issues.

Friction stir welding (FSW) is a solid state welding process that has many advantages over fusion welding methods. FIG. 1 is a perspective view of a tool being used for friction stir welding that is characterized by a generally cylindrical tool 10 having a shoulder 12 and a pin 14 extending outward from the shoulder. The pin 14 is rotated against a work piece 16 until sufficient heat is generated, at which point the pin of the tool is plunged into the plasticized work piece material. The work piece 16 is often two sheets or plates of material that are butted together at a joint line 18. The pin 14 is plunged into the work piece 16 at the joint line 18. Although this tool has been disclosed in the prior art, it will be explained that the tool can be used for a new purpose. It is also noted that the terms "work piece" and "base material" will be used interchangeably throughout this document.

The frictional heat caused by rotational motion of the pin 14 against the work piece material 16 causes the work piece material to soften without reaching a melting point. The tool 10 is moved transversely along the joint line 18, thereby creating a weld as the plasticized material flows around the pin from a leading edge to a trailing edge. The result is a solid phase bond 20 at the joint line 18 that may be generally indistinguishable from the work piece material 16 itself, in comparison to other welds.

It is observed that when the shoulder 12 contacts the surface of the work pieces, its rotation creates additional frictional heat that plasticizes a larger cylindrical column of material around the inserted pin 14. The shoulder 12 provides a forging force that contains the upward metal flow caused by the tool pin 14.

During FSW, the area to be welded and the tool are moved relative to each other such that the tool traverses a desired length of the weld joint. The rotating FSW tool provides a continual hot working action, plasticizing metal within a narrow zone as it moves transversely along the base metal, while transporting metal from the leading face of the pin to its trailing edge. As the weld zone cools, there is typically no solidification as no liquid is created as the tool passes. It is often the case, but not always, that the resulting weld is a defect-free, re-crystallized, fine grain microstructure formed in the area of the weld.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Previous patents by some of the inventors such as U.S. Pat. Nos. 6,648,206 and 6,779,704 have taught the benefits of being able to perform friction stir welding with materials that were previously considered to be functionally unweldable. Some of these materials are non-fusion weldable, or just difficult to weld at all. These materials include, for example, metal matrix composites, ferrous alloys such as steel and stainless steel, and non-ferrous materials. Another class of materials that were also able to take advantage of friction stir welding is the superalloys. Superalloys can be materials having a higher melting temperature bronze or aluminum, and may have other elements mixed in as well. Some examples of superalloys are nickel, iron-nickel, and cobalt-based alloys generally used at temperatures above 1000 degrees F. Additional elements commonly found in superalloys include, but are not limited to, chromium, molybdenum, tungsten, aluminum, titanium, niobium, tantalum, and rhenium.

It is also noted that the phrase "friction stir processing" may also be referred to interchangeably with solid state processing. Solid state processing is defined herein as a temporary transformation into a plasticized state that typically does not include a liquid phase. However, it is noted that some embodiments allow one or more elements to pass through a liquid phase, and still obtain the benefits of the present invention.

In friction stir processing, a tool pin is rotated and plunged into the material to be processed. The tool is moved transversely across a processing area of the material. It is the act of causing the material to undergo plasticization in a solid state process that can result in the material being modified to have properties that are different from the original material.

The main disadvantage with FSW is a remaining hole left in the work pieces at the end of the weld. In many cases this is not a problem since a run off tab can be used at the end of the weld and later removed. A retractable pin can be used as the weld progresses to eliminate the end hole; however the tool and equipment requirements are extensive and costly. Tool geometries that allow the tool to be extracted from the weld gradually during FSW can also be used but the added process time combined with the added heat cycle over an existing weld increases cost and decreases base metal properties.

Friction stir spot welding (FSSW) is now being used experimentally to join advanced high strength steels in lap welding configurations. FSSW is being used commercially to lap weld aluminum components as described in US Patent application 20050178817. Two approaches are currently used.

The first approach involves plunging a pin tool (a FSSW tool comprised of a pin and a shoulder) into work pieces until the work pieces are spot friction welded together. The disadvantage with this method is the hole 26 left behind from the pin as shown in FIG. 2. The bond between the work pieces 28 is achieved under the shoulder of the tool while the pin hole reduces the strength of the weld.

A second method involves the design of equipment to force material back into the pin hole (U.S. Pat. No. 6,722,556). This method is quite cumbersome because of the large spindle head, fixturing requirements, and loads needed to make a spot weld.

It would be an advantage over the state of the art in the joining of metal work pieces to be able to provide and system and method that uses a partially consumable tool to perform FSSW using a rivet in a rapid and economical manner.

BRIEF SUMMARY OF THE INVENTION

In a first aspect of the invention, a friction stir tool is provided to perform friction stir riveting using a at least a partially consumable pin, wherein the pin includes a cutting edge on a bottom surface thereof, wherein the tool is rotated at a first speed to enable cutting by the pin into a first material that is overlapping a second material, wherein after the pin has cut to a sufficient depth, the rotational speed of the tool is increased to thereby enable plasticization of the consumable pin, the first material, and the second material, wherein the tool is then rapidly decelerated until stopped, enabling diffusion bonding between the pin, the first material and the second material.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
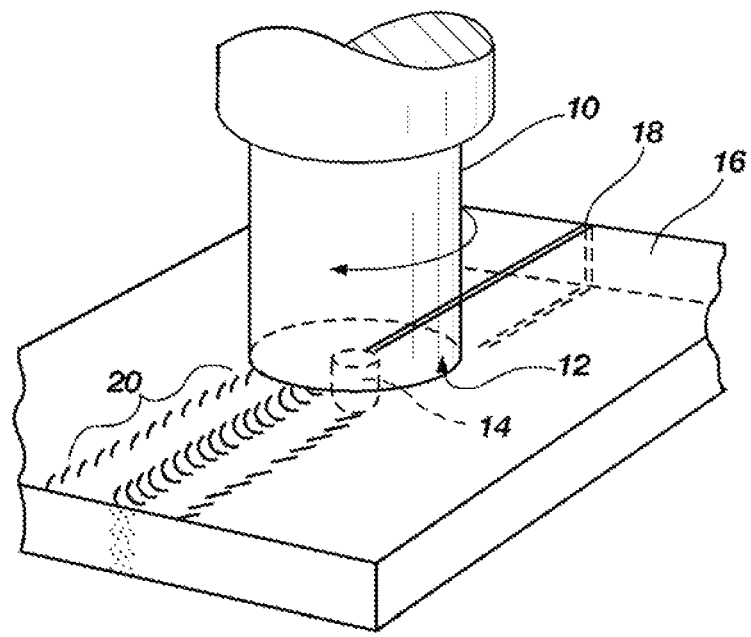
FIG. 1 is a prior art perspective view of an existing friction stir welding tool capable of performing friction stir welding on high melting temperature materials.
Figure 2:
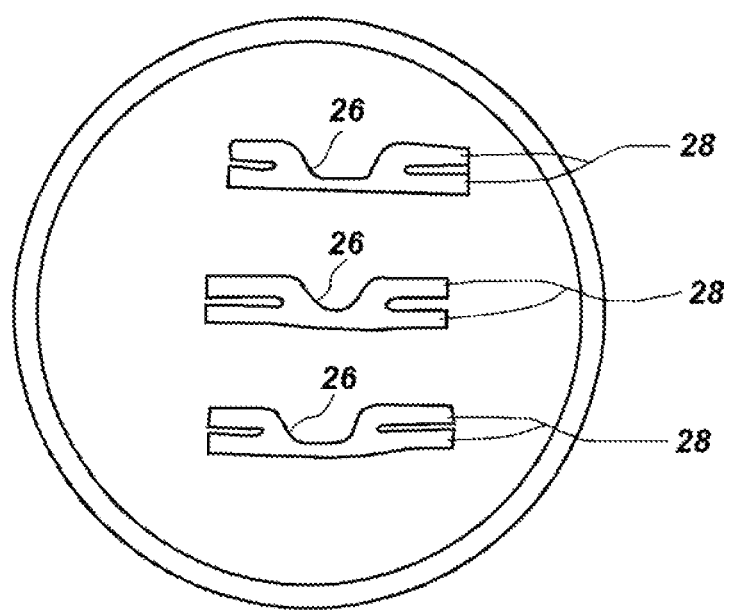
FIG. 2 is a profile view of three welds performed using friction stir spot welding (FSSW) as done in the prior art.
Figure 3:
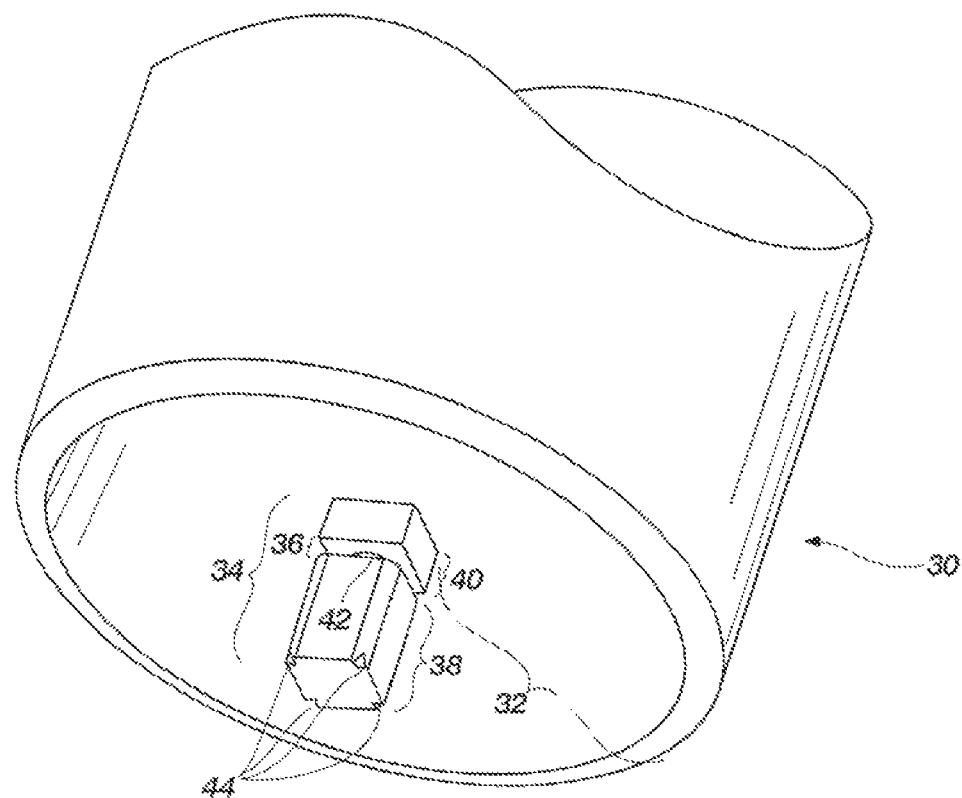
FIG. 3 is a perspective view of a rotational tool that is constructed in accordance with the principles of one embodiment of the present invention that can perform fiction stir riveting.

In a first aspect of the invention, a novel approach is used to solve many of the joining problems mentioned above. A rotating friction stir riveting tool having a non-consumable shoulder combined with a detachable and at least partially consumable pin forms the basis of a friction stir riveting joining method of the present invention. The pin may be totally consumable or partially consumable. FIG. 3 shows an example of how the tool can be constructed.

FIG. 3 shows a friction stir riveting tool 30 having a shoulder area 32 and a detachable and at least partially consumable pin 34. In this particular embodiment, the detachable and at least partially consumable pin 34 includes a small gap 36. The small gap 36 is formed by a much smaller pin diameter portion 42 of the pin 34. This small pin diameter portion 42 of the pin 34 will be caused to break. The small gap 36 enables the detachable portion 38 of the pin 34 to remain embedded within the work pieces as a rivet. It is also noted that the non-detached portion 40 of the pin 34 might also be the top of another pin segment as will be explained.

Figure 4:
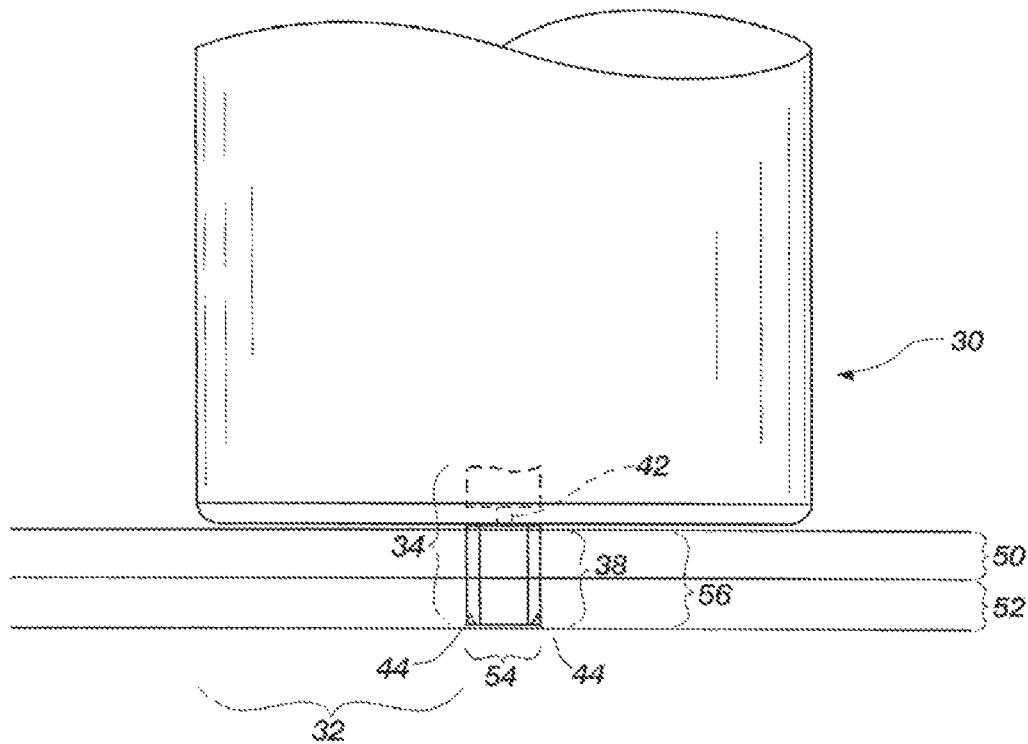
FIG. 4 is a profile view of the tool of FIG. 3 wherein the consumable pin has fully penetrated two work pieces.

Using FIG. 4 as an illustration, to friction rivet steel or another metal using a tool of this first embodiment of the present invention, the tool 30 is rotated at a speed that allows the pin 34 of the tool to machine a first work piece material 50 away to form a hole 54 therein. Features can be added to the end of the pin 34 to facilitate machining the desired hole. For example, a cutting feature 44 is shown in this first embodiment.

It is preferred but not required that the depth 56 of the hole 54 extend completely through the first work piece material 50 and at least partially into the second work piece material 52.

It should be understood that depending upon the application, the hole 54 may only extend partially into the first work piece material 50, completely through the first work piece material but not into the second work piece material 52, completely through the first work piece material but only partially into the second work piece material, or substantially through both the first and the second work piece materials. One the initial hole 54 has been made, the tool 30 can then have the pin 34 make the desired level of penetration in accordance with understood principles of friction stir riveting. The pin 34 may extend completely through both the first and second work piece materials 50, 52, or it may extend completely through the first work piece material but only partially into the second work piece material. Again, this depends upon the application of the user.

In this first embodiment, once the depth 56 of the hole 54 has extended into the second work piece 52 as shown in FIG. 4, the rotational speed of the tool 30 is slowed down to generate heat between the pin 30 and the two first and second work pieces 50, 52 that are being joined together. A spindle (not shown) that is holding and rotating the tool 30 can either be immediately stopped or slowed down until the torque required to rotate the tool exceeds the shear strength of the smaller pin diameter portion 42. The smaller pin diameter portion 42 is designed to shear the detachable portion 38 of the pin 34 off of the tool 30 at a specified torque.

In this first embodiment, once the detachable portion 38 of the pin 34 has been sheared off the tool 30, the tool is retracted and a new pin 34 can be replaced. The detachable portion 38 of the pin 34 or rivet left behind in the first and second work piece materials 50, 52 is friction welded into the work pieces. There is a bond not only under the tool shoulder between the first and second work pieces 50, 52 but around the pin 34 or rivet.

Figure 5:
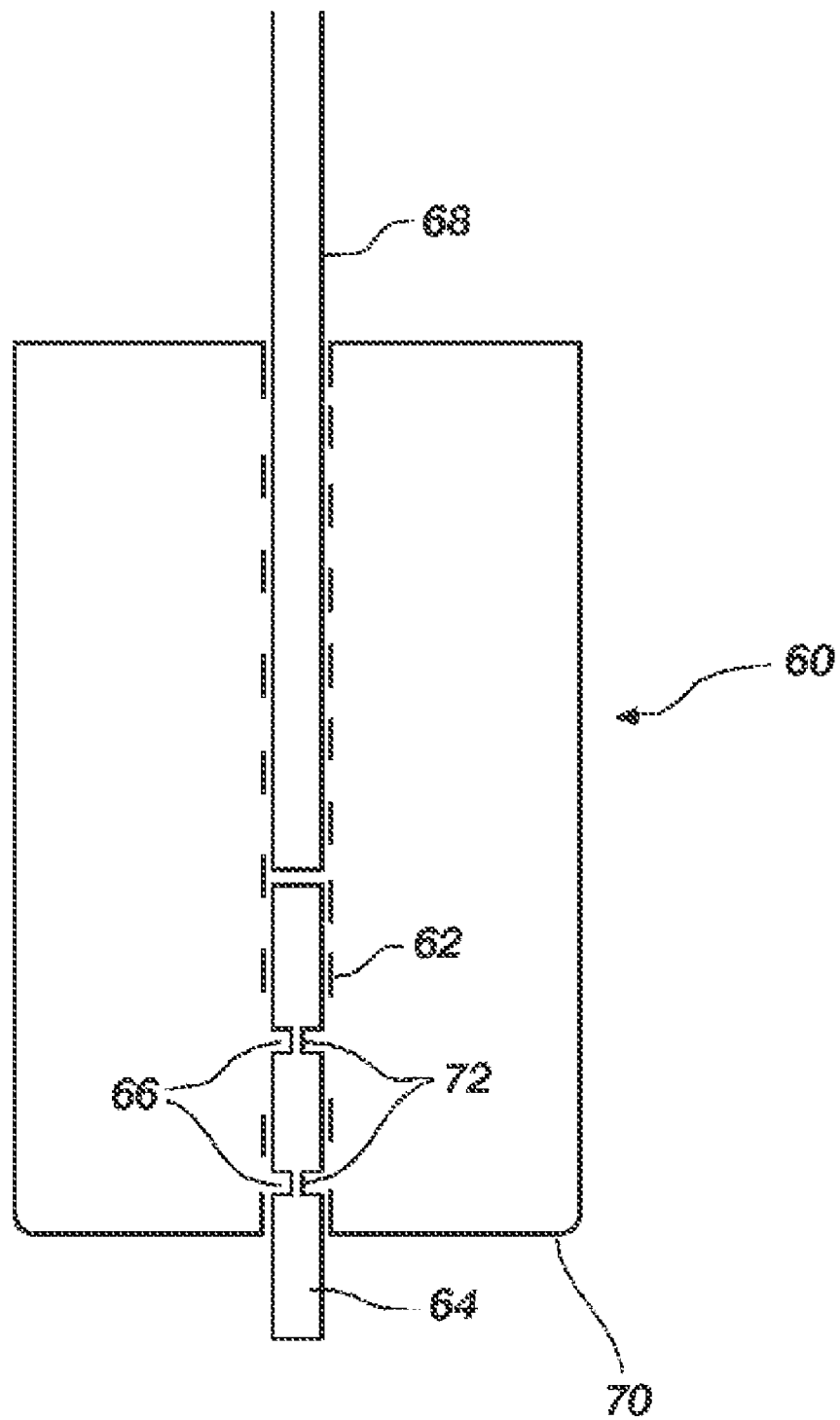
FIG. 5 is a profile cut-away view of a tool having a central hole for a multi-segmented pin for rapid friction stir riveting.

In an alternative embodiment of the present invention as shown in FIG. 5, a tool 60 has a hole 62 disposed through a central axis. The hole 62 allows a multi-segmented pin 64 (shown here with three segments separated by a smaller diameter pin portion 72) to be inserted and pushed through the hole 62 as needed. The multi-segmented pin 64 includes a plurality of gaps 66 having a smaller diameter pin portion 72. Some type of plunger mechanism 68 would then be used to push the multi-segmented pin 64 through the tool 60 and out a working end 70. As each segment of the multi-segmented pin 64 is broken off, the plunger mechanism 68 pushes the multi-segmented pin down through the hole 62 until enough of the pin 64 is exposed for the next friction stir riveting process. In this way, multiple rivets can be inserted into work pieces without having to stop and reload a multi-segmented pin 64.

The number of segments that can be used in a multi-segmented pin 64 should not be considered to be limited to three. FIG. 5 is for illustration purposes only. More segments can be disposed on the multi-segmented pin 64. The number of segments may also depend on the length of the tool 60 and the length of the plunger mechanism 68.

Figure 6:
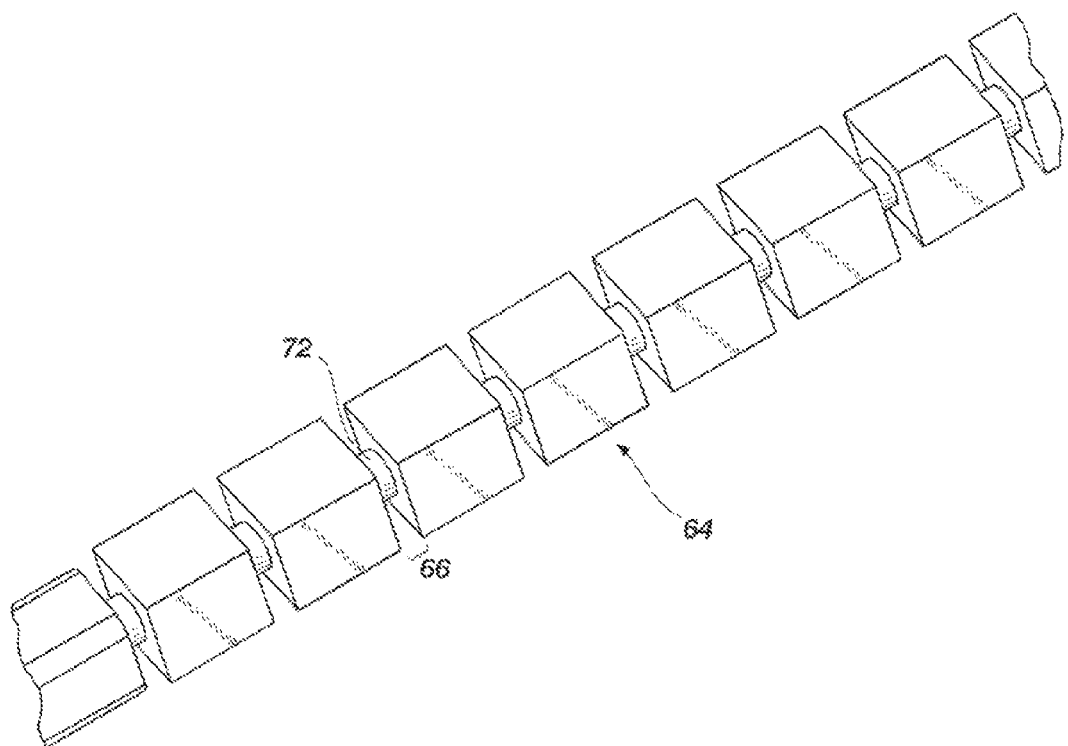
FIG. 6 is a perspective view of a multi-segmented consumable pin that is manufactured in accordance with the principles of one embodiment of the present invention.

FIG. 6 is provided to illustrate a multi-segment pin 64 that can be used for an automatic and rapid friction stir riveting process. The segments of the multi-segment pin 64 are co-axial so that they can be disposed in the hole through the central axis of the friction stir riveting tool 60.

The materials used to create a tool having a shoulder that can be used in the present invention can be found from tools created by some of the inventors that can be used to join high melting temperature materials such as steel and stainless steel together during the solid state joining processes of friction stir welding.

This technology involves using a special friction stir welding tool. The shoulder can be created using materials such as polycrystalline cubic boron nitride (PCBN) and polycrystalline diamond (PCD). Other materials that can be included are refractories such as tungsten, rhenium, iridium, titanium, molybdenum, etc.

The work pieces that can be joined using the principles of the present invention include materials that have melting temperatures higher than bronze and aluminum. This class of materials includes, but is not limited to, metal matrix composites, ferrous alloys such as steel and stainless steel, non-ferrous materials, superalloys, titanium, cobalt alloys typically used for hard-facing, and air hardened or high speed steels. However, the present invention can also be used on materials that may be considered to be all other lower melting temperature materials that are not included within the definition of the higher melting temperatures described above.

The shoulder 32 of the tool 30 can be made from polycrystalline cubic boron nitride or similarly described materials that can prevent adhesion of the shoulder to the first work piece 50 and provide superior thermal stability and wear resistance characteristics. Several shoulder configurations can be used to form the shape of the rivet head or even cut away the rivet head after the pin 34 has been friction welded into the work pieces 50, 52.

The materials used for the pin 34 are generally going to be those that can consumed during the friction stir riveting process. Such materials will preferably enhance the bond between the first and second work piece materials, and are known to those skilled in the art of friction stir welding.

Alternative embodiments of the present invention include various aspects that should also be considered as important elements. First, a variety of cutting structures or profiles can be used on the end, of the pin 34 that will be inserted as a rivet. A helically notched profile could be used as an alternate cutting structure instead of the feature shown in FIG. 3.

In another alternative embodiment, inert gas such as argon or carbon dioxide can be caused to flow through the center of the tool 30 to prevent oxidation during friction stir riveting.

In another alternative embodiment, more than two work pieces might be joined using the friction stir riveting process of the present invention. The length of the segments of the pin 34 would therefore be adjusted according.

In another alternative embodiment, it should be noted that the work pieces that are being joined can be the same or different materials, depending upon the application.

Similarly, the material used in the pin might be a different material from the work pieces, the same material as at least one of the work pieces, or the same as the material on all the work pieces.

Pin profiles can be varied greatly. The pin profile can be a taper, hexagonal, or any desired shape that will perform a cutting process and friction stir riveting process. The shape will likely depend on various aspects, such as the desired bonding characteristics or the strength of the various materials being used.

In another embodiment, the pin could also be hollow. The pin could be in rod or wire form and fed automatically through the center of the tool. When a square shape is used for the pin, this allows for torque from the tool to be transmitted to the pin or rivet. However, other torque transmitting profiles could be used. Even a round shape could be used for the pin as long as a clamping force or clamping mechanism on the outside diameter of the pin material is sufficient to keep the pin from slipping within the tool when rotational forces are applied.

The pin or rivet can have a variety of hardnesses or hardness profiles to facilitate work piece penetration.

The tool can run to a specified position or load value at RPMs ranging from 1 to 10,000 RPM.

The tool could be run in the same configuration as fusion spot welding. For example, rather than using clamping with welding tips in a C clamp configuration, a small diameter rotating tool (FIG. 3) could be placed in a C clamp on the end of a robot. The C clamp configuration could also be used manually.

The pin can have a fastener on the "head" so mechanical attachment can be used at that location. For example, the end of a friction rivet can have a threaded stub that is left to protrude above the work pieces after they have been joined. A nut could then be used to attach another component to the work pieces.

Some of the advantages of the friction stir riveting process include, but should not be considered limited to, a solid state joining process that is rapid, low energy input process requirements, low residual stresses because of the solid state process, no predrilled hole is necessary as in conventional riveting, there is reduced or eliminated distortion of the work pieces, no hole is left in the work pieces as in FSSW, the process can be used in confined areas, Z-axis forces are comparable to current forces required to resistance spot weld, the shoulder/pin ratio can be sized to generate a specific heat profile to optimize joint strength, corrosion resistant pin materials can be used, because the process is completed at an elevated temperature the formation of the pin or rivet has not yielded and will have greater energy absorption characteristics, the pin or rivet material can be overmatched to the work piece material for greater strength, and the rivet or pin can be used at the tip of a crack to prevent further crack propagation in a work piece.

It is generally the case that the pin will be made using a material that is harder than the materials being joined. However, the pin might be softer, but pushed with sufficient force and quickly enough; it can be used to join the harder work piece materials.

Another aspect of the invention is the option of removing the material being cut from the hole in the work pieces and being formed by the pin. One method of removing the material is to use a pecking motion. A pecking motion of the tool can also be combined with a fluid flow to remove the material. The fluid can be compressible or non-compressible, including gas, air, mist, and water.

As previously mentioned the present invention can be used to join different materials together, and is not limited to three body (two work pieces and a pin) configurations. Multiple layers of materials can be joined simultaneously. Any number of materials can be bonded so long as the materials are subjected to a temperature gradient that is less than the melting temperature of the materials being bonded.

The range of surface travel speeds of the tool should be considered to be from 0.1 mm per minute to 10 meters per minute. The rotational speed of the tool can vary from 1 rpm to 100,000 rpm.

Coatings can be used on the tool, on the work pieces being joined, or on both the tool and the workpieces.

The tool of the present invention can be a composite tool, such as a tool having a CBN shoulder, or different materials having a higher or lower modulus than the materials being bonded.

The hardness of the materials being bonded should be considered to include all materials on the Rockwell Scales A, B and C.

The cutting edge on the pin of the present invention can have any suitable cutting geometry. Thus, any feature can be included on the pin that enables cutting, cutting and heating, and heating with the intent of causing a bond. The pin may also be threaded. Thus, the pin does not have to have a cutting geometry. An alternative embodiment uses heating of the pin to enable creation of a hole or an aperture in or through other work piece materials.

The present invention enables diffusion bonding on multiple planes, include axially and the sides of the hole that is created.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A friction stir riveting tool, said tool comprising:
   a shank having a non-consumable shoulder;
   a consumable pin including at least four major external surfaces disposed within a hole along a central axis of the non-consumable shoulder, wherein the consumable pin includes a smaller diameter pin portion that enables breaking off of a portion of the consumable pin;
   wherein the consumable pin is prevented from rotation within the hole in the non-consumable shoulder when the shank is rotated; and
   wherein the consumable pin includes at least one cutting edge on an absolute end of the pin, wherein the at least one cutting edge is a cutout which extends from the absolute end of the pin vertically along a boundary formed by a meeting of at least two of the at least four major external surfaces.

2. The friction stir riveting tool as defined in claim 1 wherein the friction stir riveting tool further comprises the consumable pin being comprised of materials suitable for diffusion bonding with a work piece material that the consumable pin is riveting.

3. The friction stir riveting tool as defined in claim 1 wherein the friction stir riveting tool further comprises:
   a hole disposed completely through the shank to the non-consumable shoulder; and
   a plunger mechanism disposed at an end of the shank opposite the non-consumable shoulder, wherein the plunger mechanism advances the consumable pin toward a working end of the friction stir riveting tool.

4. The friction stir riveting tool as defined in claim 1 wherein the friction stir riveting tool further comprises the consumable pin formed having a generally square cross-section to thereby prevent rotation of the consumable pin when the friction stir riveting tool is rotated.

5. The friction stir riveting tool as defined in claim 1 wherein the friction stir riveting tool further comprises a clamping mechanism on the friction stir riveting tool to thereby prevent rotation of the consumable pin when the friction stir riveting tool is rotated.

6. The friction stir riveting tool as defined in claim 1 wherein the consumable pin is further comprised of a plurality of consumable segments, wherein the plurality of consumable segments are separated by a smaller diameter pin portion that is capable of being broken to thereby leave a segment of the plurality of consumable segments in a work piece.

* * * * *